(12) United States Patent
Cho et al.

(10) Patent No.: US 9,081,540 B1
(45) Date of Patent: Jul. 14, 2015

(54) ADJUSTABLE DISPLAY DEVICE AND METHOD OF DRIVING THE SAME IN FLAT MODE AND CURVED MODE

(71) Applicant: LG Display Co., Ltd., Seoul (KR)

(72) Inventors: Seok-Hyo Cho, Goyang-si (KR); Dong-Kwan Yoo, Pyeongtaek-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/553,111

(22) Filed: Nov. 25, 2014

(30) Foreign Application Priority Data

Apr. 29, 2014 (KR) ......................... 10-2014-0051846

(51) Int. Cl.
*H05K 5/00* (2006.01)
*H05K 7/00* (2006.01)
*G06F 1/16* (2006.01)

(52) U.S. Cl.
CPC .................................. *G06F 1/1601* (2013.01)

(58) Field of Classification Search
CPC . H05K 5/0017; H01L 51/0097; G09G 3/3688
USPC ............... 361/679.01–679.09, 679.1–679.19, 361/679.21–679.29, 679.31–679.45, 361/679.55–679.6, 724–747; 248/917–924, 248/80–88, 155.1–155.5, 166–173, 248/180.1–186.2, 229.1–231.51, 271.4, 248/292.14, 316.1–316.8
See application file for complete search history.

(56) References Cited

U.S. PATENT DOCUMENTS

2014/0198465 A1* 7/2014 Park .............................. 361/749

* cited by examiner

*Primary Examiner* — Jerry Wu
(74) *Attorney, Agent, or Firm* — McKenna Long & Aldridge LLP

(57) ABSTRACT

An adjustable display device capable of being adjusted between flat and curved including a display panel having a rear and an adjustable system at the rear of the display panel. The adjustable system including a rod, a fixing device attached to the rear of the display panel to support the rod and a driving system to transmit power to the rod.

14 Claims, 9 Drawing Sheets

ADJUSTABLE DISPLAY DEVICE AND METHOD OF DRIVING THE SAME IN FLAT MODE AND CURVED MODE

The present application claims the priority benefit of Korean Patent Application No. 10-2014-0051846 filed in Republic of Korea on Apr. 29, 2014, which is hereby incorporated by reference in its entirety.

BACKGROUND

1. Field of the Disclosure

The present disclosure relates to an adjustable display device used in a flat mode or curved mode and a method of driving the same.

2. Discussion of the Prior Art

Recently, the world has seen rapid advances in the display field and various flat display devices have been developed and come into focus.

Flat display devices include, for example, liquid crystal display devices (LCDs), plasma display panel devices (PDPs), field emission display devices (FEDs), electroluminescent display devices (ELDs), and organic light emitting diodes (OLEDs). These flat display devices have high performances with thin profile, lightweight, and low power consumption and have rapidly replaced cathode ray tubes (CRTs).

The flat display device has advantages of high display quality, ultrathin profile, lightweight, large-sized screen. It also has advantages in interior decoration and design. Thus, the flat display has applications in a variety of fields.

Recently, a flat display device having a curved surface has emerged as a next generation display device. The curved display device improves user experience and brings more realistic images to the user. The viewing radius is greatly improved over that of a standard flat display device.

There is also a need, however, for adjustable display devices meeting both the advantages of the flat display device and the advantages of the curved display device.

The adjustable display device can be operated in a flat mode or a curved mode depending on user preference and convenience.

SUMMARY

Accordingly, embodiments of the present disclosure are directed to an adjustable display device and a method of driving the same that can vary the display device between a flat mode and a curved mode that substantially obviates one or more problems due to limitations and disadvantages of the related art.

The present disclosure is also directed to an adjustable display device and a method of driving the same that can obtain a range of curvature ratios with precision.

The present disclosure is further directed to an adjustable display device and a method of driving the same that can minimize noise and vibration when varying between a flat mode and a curved mode, and that is lightweight and thin profile.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided an adjustable display device capable of being adjusted between flat and curved comprising: a display panel having a rear; an adjustable system at the rear of the display panel, the adjustable system including; a rod; a fixing device attached to the rear of the display panel to support the rod; and a driving system to transmit power to the rod.

An adjustable display device having a driving system and a display panel, the driving system comprising: a motor generating a rotary power in a first direction and a second direction, a bracket receiving the rotary power of the motor and converting the rotary power of the motor into a linear force, a rack gear in the bracket; a pinion interlocked with the rack gear and connected to the rod, wherein the rotary power generates a movement of the rod to move a portion of the display panel with respect to a center of the display panel.

A method of adjusting a display device between flat and curved, the display device having a display panel, an adjustable system covering a rear of the display panel having a rod, a fixing device to support the rod and a driving system to transmit a power to the rod, the method comprising: activating the driving system to rotate the rod to adjust a curvature of the display panel.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to exemplary embodiments, examples of which are illustrated in the accompanying drawings.

Figure 1A:
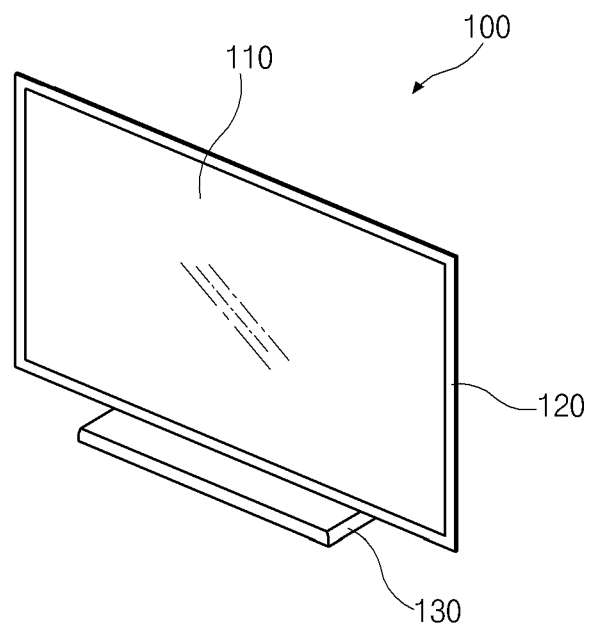
FIGS. 1A to 1C are schematic perspective views illustrating an adjustable display device according to an embodiment of the present invention.
Figure 1B:
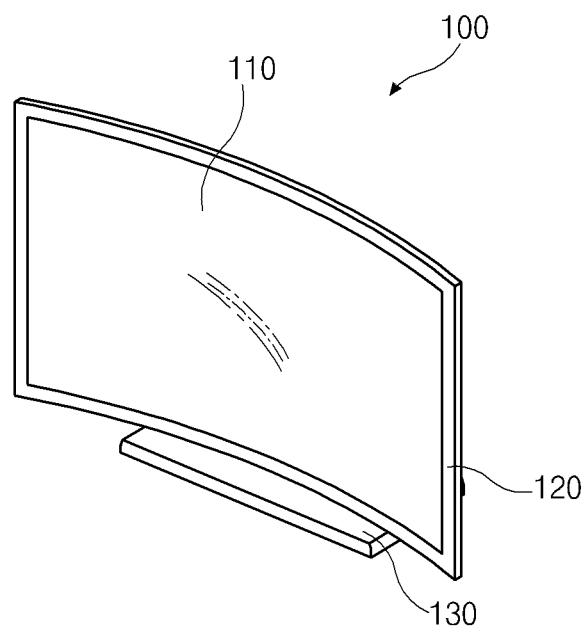
Figure 1C:
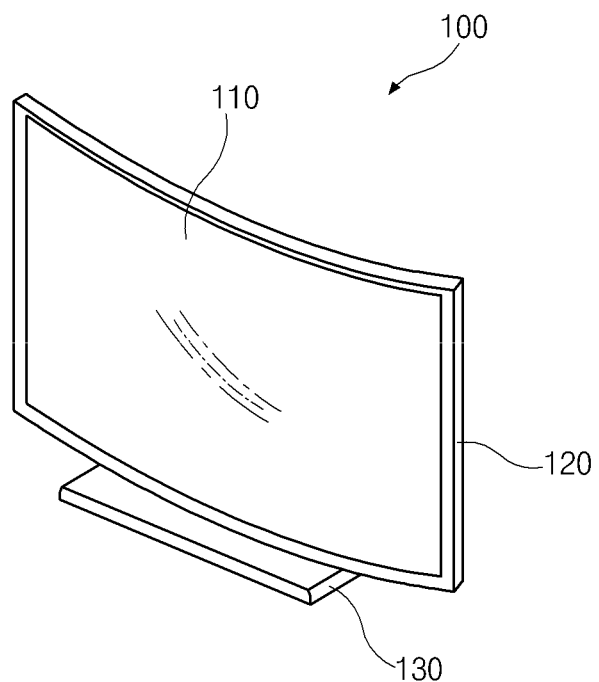
Figure 2:
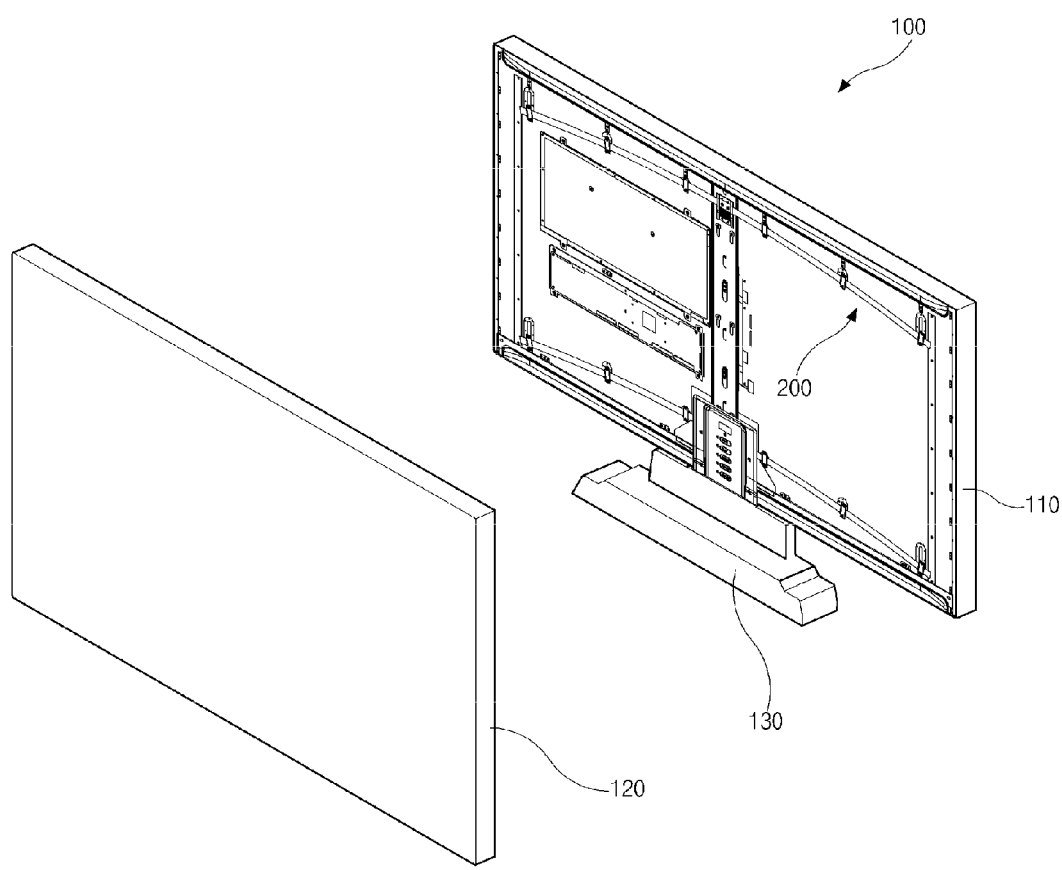
FIG. 2 is a schematic perspective view illustrating a rear surface of the adjustable display device according to the embodiment of the present invention.

FIGS. 1A to 1C are schematic perspective views illustrating an adjustable display device according to an embodiment of the present invention, and FIG. 2 is a schematic perspective view illustrating a rear surface of the adjustable display device according to the embodiment of the present invention.

Referring to FIGS. 1A-1C and 2, the adjustable display device 100 according to the embodiment includes a display panel module 110 to display images, an outer case 120 accommodating the display panel module 110, and a supporting mount 130 connected to a bottom portion or a rear portion of the outer case 120 to fix the outer case 120 onto a desk or wall.

The display panel module 110 may include, as examples, LCD, PDP, FED, ELD, or OLED. Among these displays, the OLED, has recently become a leader of flexible display devices that can maintain display performance even when bent like paper. The OLED is an emissive device and does not need a backlight such as used for an LCD. Thus, it is relatively lightweight and has a thin profile. Thus, it is a preferred display type although other display devices are certainly applicable.

Further, the OLED have advantages in that it has better viewing angle and contrast ratio than an LCD. It also has advantages in (1) power consumption, (2) operation in low DC (direct current) voltage, (3) fast response speed, (4) withstanding external force because its internal components are solid, and (4) wide range of operating temperatures. Moreover, because the manufacturing process is simple, production cost can be reduced much greater than that of an LCD.

The display panel using the OLED includes a first substrate and a second substrate facing the first substrate. The first and second substrates are attached to each other using a protection layer having adhesion property.

Even though not shown in the drawings, the first substrate, includes a driving thin film transistor in each pixel region, a first electrode connected to the driving thin film transistor, an organic light emitting layer on the first electrode and emitting a particular color light, and a second electrode on the organic light emitting layer.

The organic light emitting layer emits red, green or blue. Generally, the pixel regions use respective organic light emitting layers emitting red, green and blue.

The first and second electrodes, and the organic light emitting layer in each pixel region form a light emitting diode. The display panel having this structure may use the first electrode as an anode and the second electrode as a cathode.

The display panel is assembled with a back cover and a cover window to form the display panel module 110. The back cover is designed such that it covers a rear surface and a part of a side surface of the display panel with an opening at the front thereof to display images from the display panel.

The cover window is on the front surface of the display panel to protect the display panel and coupled with the back cover.

As shown in FIG. 1A, the adjustable display device 100 can be operated in a flat mode, in which the display panel module 110 is in a flat state. The flat state may be better for space issues. As shown in FIG. 1B, the adjustable display device 100 can be operated in a concave curved mode, in which the display panel module 110 has an inward curved surface, to enhance a user experience and bring a more realistic image. In the concave curved mode, the display panel module 110 is concave curved inward in the middle from the front.

Further, as shown in FIG. 1C, the adjustable display device 100 can be operated in a convex curved mode, in which the display panel module 110 has an outward curved surface, to have a wide viewing radius. This mode can deliver contents such as news and advertisement to many viewers. In particular, in the convex curved mode, the display panel module 110 is convex curved outwards in the middle to the front.

Accordingly, the adjustable display device 100 varies selectively among the flat mode, the concave curved mode, and the convex curved mode. The user is able to conveniently select between flat and curved modes, as desired.

The variation of the operation modes is made possible by an adjustable system 200 mounted on the rear surface of the display panel module 110 i.e., the rear surface of the back cover of the display panel module 110. Thus, the display device 100 can be operated in the flat or curved mode using the adjustable system 200.

Figure 3:
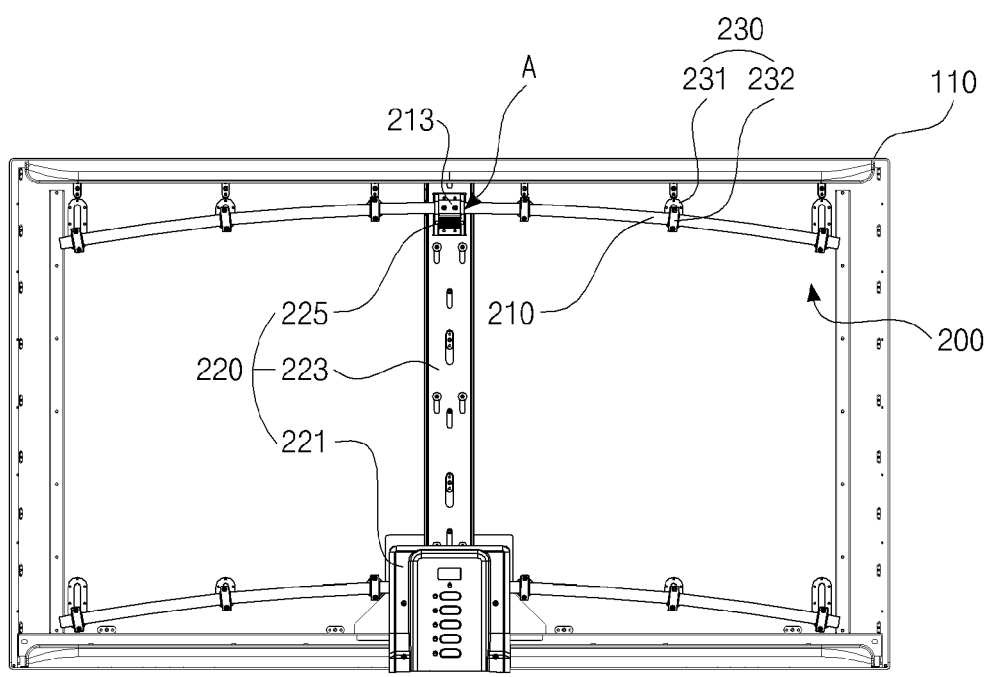
FIG. 3 is a schematic perspective view illustrating an adjustable system according to the embodiment of the present invention.

FIG. 3 is a schematic perspective view illustrating an adjustable system according to the embodiment of the present invention.

Referring to FIG. 3, the adjustable system 200 is mounted on the back cover of the display panel module 110, and includes a bending pipe or rod 210, a fixing device 230 for the rod 210, and a driving system 220 to transmit a power to the rod 210.

The rod 210 has a curved shape and is mounted at both edge portions on a length direction of the rear surface of the display panel module 110. The rod 210 is mounted such that a peak point A of the curved surface of the rod 210 is located at the center of the rod 210.

Further, the rod 210 is mounted such that the peak point A is at one edge portion of the display panel module 110.

The rod 210 may be made of aluminum (Al) material or stainless steel material having an excellent stiffness. Regardless of the material, the rod should be sufficiently rigid to bend the display in accordance with the present embodiment.

The rod 210 may have any diameter to the extent that the rod 210 applies a pressure under its load to the display panel module 110. The rod 210 is preferably configured to have a length corresponding to the length direction of the display panel module 110.

The rod 210 is mounted at the rear surface of the display panel module 110 using a plurality of fixing devices 230. The fixing device 230 includes a mounting portion 231 which is directly mounted, for example, and fixed to the display panel module 110, and a supporting portion 232 which encloses and supports the rod 210.

The supporting portion 232 contacts the rod 210, such that the rod 210 can rotate while being supported by the supporting portion 232.

The driving system 220 includes a motor 221 generating a rotational force, and a bracket 223 which converts a rotational motion of the motor 221 into a linear motion. A rack gear 225 having saw tooth shape is formed on the bracket 223.

A pinion 213 is mounted at a region of the rod 210 corresponding to the peak point A. The pinion 213 and the rack gear 225 of the driving system 220 are configured to be geared to and interlocked with each other.

Since the adjustable system 200 is mounted on the rear surface of the display panel module 110, the adjustable display device 100 can be used selectively between the flat and curved modes.

Figure 4A:
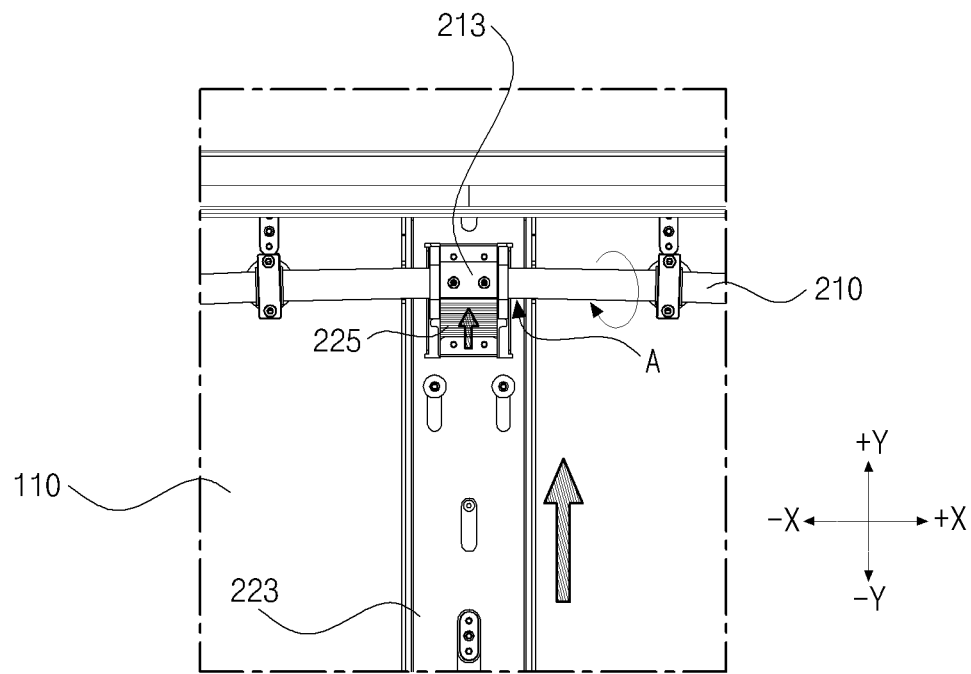
FIGS. 4A to 4C are schematic views illustration operations of the adjustable system according to the embodiment of the present invention.
Figure 4B:
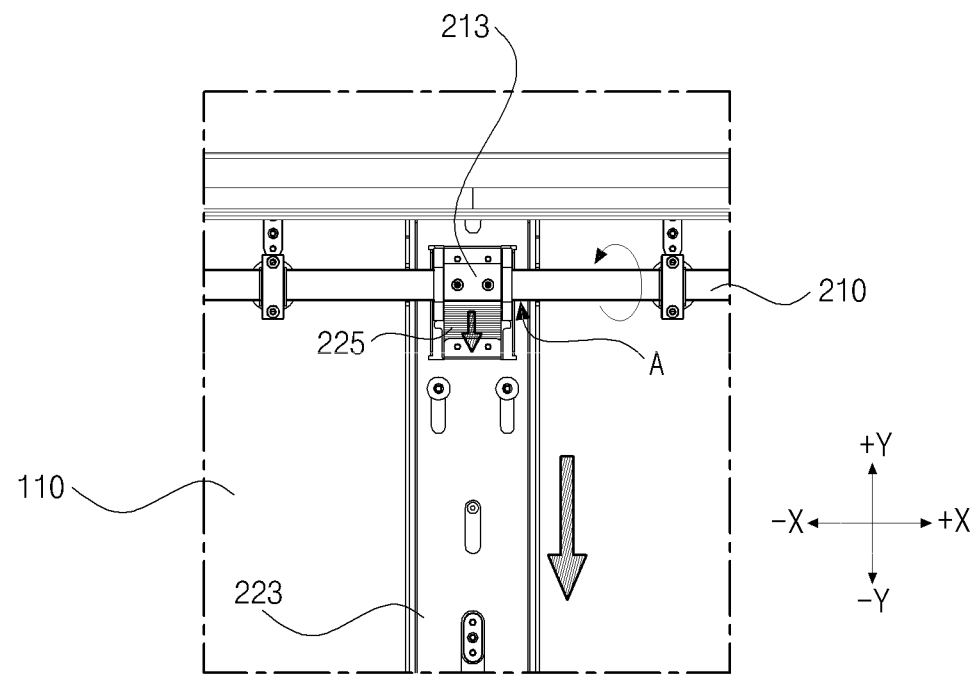
Figure 4C:
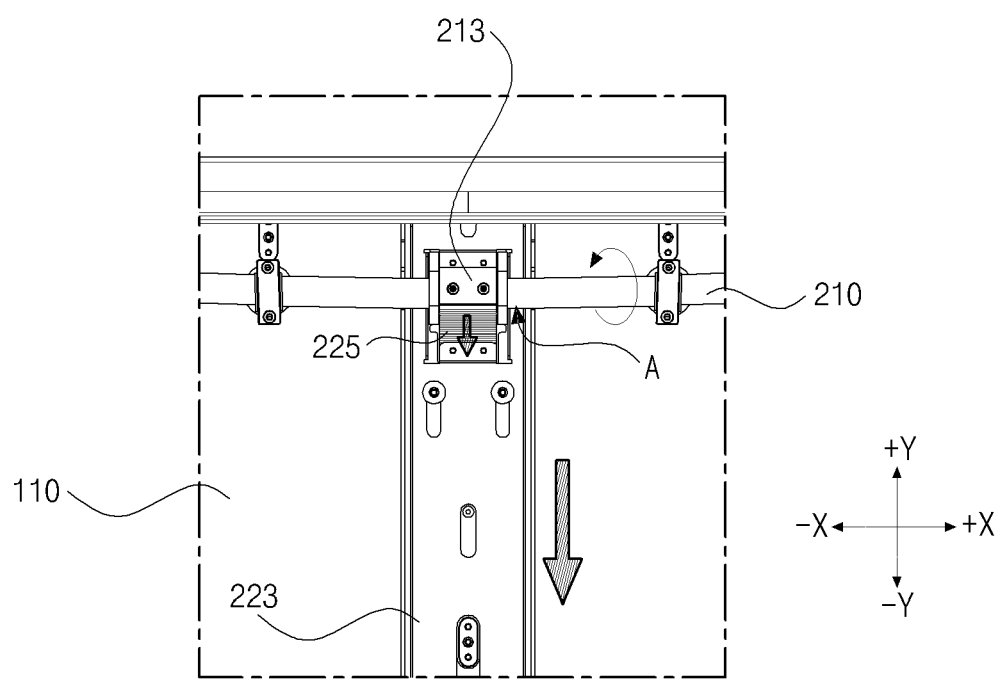
Figure 5A:
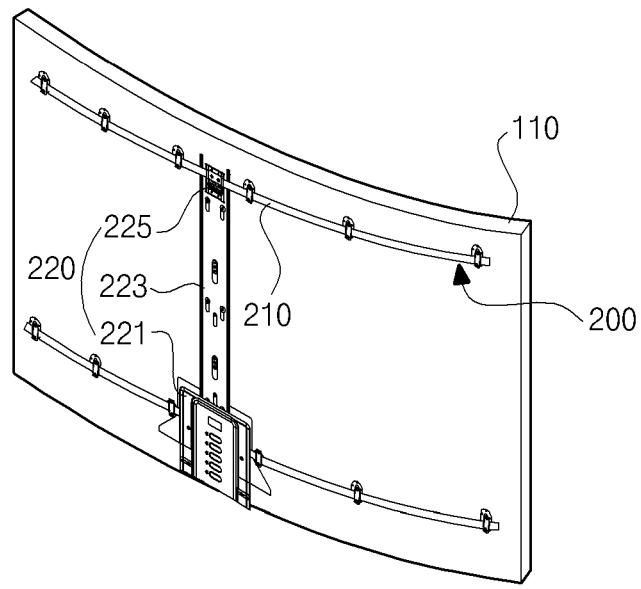
FIGS. 5A to 5C are schematic views illustrating variations of the display panel module in accordance with the operations of the adjustable system of FIGS. 4A to 4C, respectively.
Figure 5B:
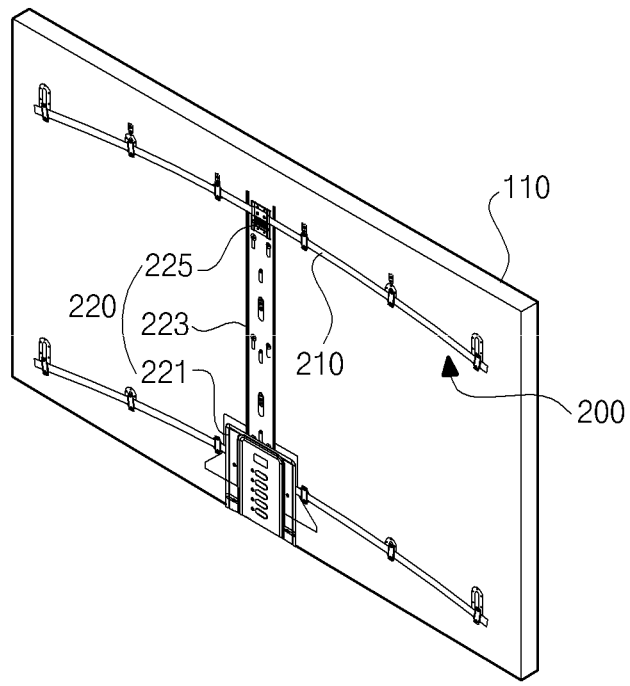
Figure 5C:
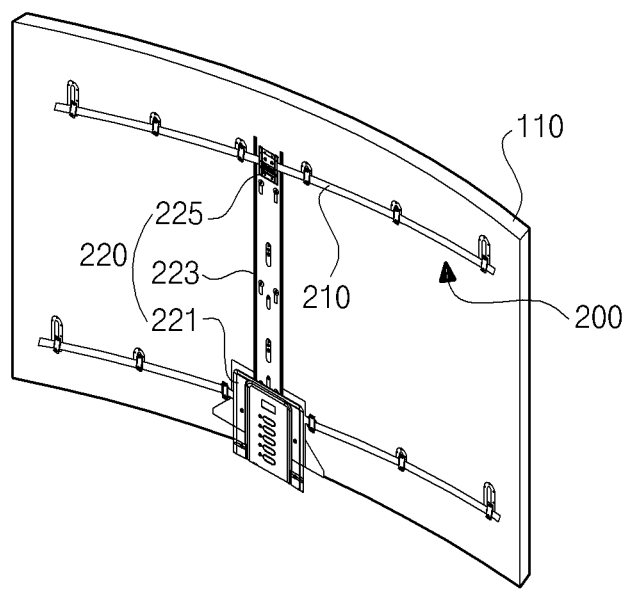

FIGS. 4A to 4C are schematic views illustrating operations of the adjustable system according to the embodiment of the present invention, and FIGS. 5A to 5C are schematic views illustrating variations of the display panel module in accordance with the operations of the adjustable system of FIGS. 4A to 4C, respectively.

Referring to FIG. 4A, the rod 210 is mounted at the back cover of the display panel module 110 such that the peak point A faces a +Y direction in the drawings.

Figure 6:
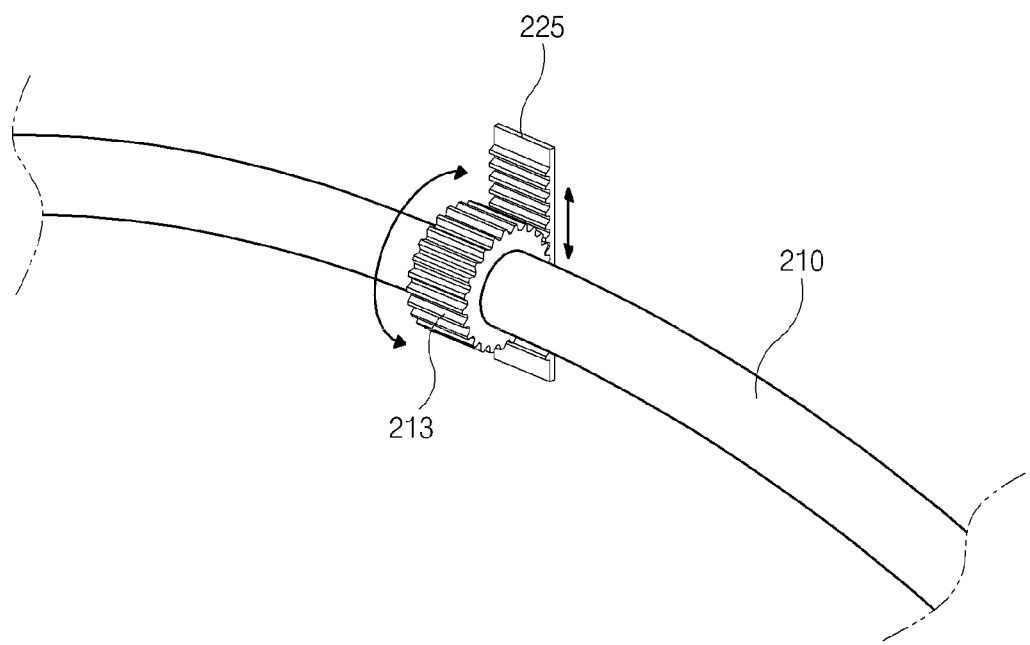
FIG. 6 is a schematic view illustrating the structural relationship of the pinion, rod and rack gear of the adjustable system.

The pinion 213 is mounted at the peak point A of the rod 210. The rack gear 225 and the pinion 213 are geared to and interlocked with each other as illustrated in FIG. 6. When the motor 221 is driven in a clockwise direction, a rotational force of the motor 221 transfers to the bracket 223, then the rotational force transferred to the bracket 223 is converted into a linear force. Then, the rack gear 225 formed on the bracket 223 moves to a direction, which the peak point A of the rod 210 face, i.e., the +Y direction.

Since the rack gear 225 moves to the +Y direction, the pinion 213 interlocked with the saw teeth of the rack gear 225 rotates to a −Y direction opposite to the moving direction of the rack gear 225 and the rod 210 fixed to the pinion 213 rotates to the −Y direction. In this case, the rod 210 rotates at a −45 degree angle, for example, and according to this rotation of the rod 210, the peak point A of the rod 210 faces backward (i.e., faces to a direction from the front to the back of the display panel module 110), and the rod 210 takes on a backward curved shape.

Since the rod 210 having an excellent stiffness (or at least sufficiently stiff) is mounted onto the rear surface of the back cover of the display panel module 110, a pressure under a load of the rod 210 is applied to the display panel module 110, and thus the rear surface of the display panel module 110 is backward curved.

As shown in FIG. 5A, the display panel module 110 has a front surface, i.e., a display surface, concave curved inward.

Through the above process, such concave curved mode can be achieved.

When the motor 221 is driven in a counterclockwise direction from the concave curved mode, as shown in FIG. 4B, the rack gear 225 moves to the −Y direction. According to this movement of the rack gear 225, the pinion 213 rotates to the +Y direction opposite to the moving direction of the rack gear 225, and the rod 210 fixed to the pinion 213 rotates to the +Y direction.

In this case, the rod 210 rotates at a +45 degree angle, for example, and according to this rotation of the rod 210, the peak point A of the rod 210 returns back to its initial position before achieving the concave curved mode. In other words, the peak point A of the rod 210 faces one edge portion of the display panel module 110 i.e., the +Y direction.

Because the rod 210 faces the +Y direction, the rod 210 applies no pressure to the display panel module 110, and thus, as shown in FIG. 5B, the display panel module 110 maintains the flat mode.

When the motor 221 is driven in a counterclockwise direction from the flat mode, as shown in FIG. 4C, the rack gear 225 moves further to the −Y direction because of the rotational force of the motor 221.

According to this movement of the rack gear 225, the pinion 213 rotates to the +Y direction opposite to the moving direction of the rack gear 225, and the rod 210 fixed to the pinion 213 rotates to the +Y direction.

In this case, the rod 210 rotates at a +45 degree angle, for example, and according to this rotation of the rod 210, the peak point A of the rod 210 faces the front of the display panel module 110, and the rod 210 takes on a forward curved shape.

Since the rod 210 having an excellent stiffness (or at least sufficiently stiff) is mounted onto the rear surface of the back cover of the display panel module 110, a pressure under a load of the rod 210 is applied to the display panel module 110. Thus, the rear surface of the display panel module 110 is forward curved.

Accordingly, as shown in FIG. 5C, the display panel module 110 has a front surface, i.e., a display surface, convex curved outward. Through the above process, the convex curved mode can be achieved.

As described above, the adjustable display device 100 has the adjustable system 200 including the rod 210 mounted on the rear surface of the display panel module 100. Accordingly, the display panel module 110 can be used variably among the flat mode, the convex curved mode, and the concave curved mode.

In other words, when space application is needed, the flat mode is conducted and an area occupied by the adjustable display device 100 can be minimized. In order to improve a user immersion and bring a realistic image thus make user feel comfort, the concave curved mode is conducted. Further, when the display device 100 is installed at an open space such as an outdoor plaza or an indoor plaza such as an airport or a terminal to deliver contents such as news and advertisement to viewers, the convex curved mode to realize a wide viewing radius may be useful.

Since the rod 210 of the adjustable system 200 is capable of having a curved surface corresponding to the desired curve in the adjustable display device 100, an exact radius or curvature ratio can be obtained in realizing the convex curved mode or concave curved mode.

Further, since the adjustable system 200 is configured to have the rod 210 and the motor 221, and the rod 210 is mounted at the rear surface of the back cover of the display panel module 110, a volume and a weight occupied by the adjustable system 200 in the adjustable display device 100 can be minimized.

Accordingly, the adjustable display device 100 can be lightweight and have a thin profile while being operable in the flat mode or curved mode.

Further, since the volume of the adjustable system 200 is minimized, design without interference with other components mounted at the rear surface of the display panel module 110 is possible, and production efficiency can be improved.

Further, when changing the adjustable display device 100 to the flat mode or the curved mode, the rack gear 225 of the bracket 223 only moves as the rod 210 rotates at −45 or +45 degrees angle, thus the motor 221 is minimally driven to a minimize vibration and noise.

Further, even when the display panel module 100 increases in size, the adjustable system 200 can be applied with the appropriate rod 210 made according to the size of the display panel module 110. Accordingly, compatibility of the display panel module 210 according to model can be improved.

As described above, the adjustable display device 100 has the rod 210 and the motor 221 mounted at the rear surface of the back cover of the display panel module 110. Accordingly, the display panel module 110 can vary among the flat mode, the concave curved mode, and the convex curved mode according to the pressure under the load of the rod 210. Thus, the display device 100 can be used selectively between the flat mode and the curved mode according to a user preference.

It will be apparent to those skilled in the art that various modifications and variations can be made in a display device of the present disclosure without departing from the sprit or scope of the invention. Thus, it is intended that the present invention covers the modifications and variations of this invention provided they come within the scope of the appended claims and their equivalents.

What is claimed is:

1. An adjustable display device capable of being adjusted between a flat mode and a curved mode, comprising:
   a display panel having a rear surface;
   an adjustable system mounted to the rear surface of the display panel to operate the display panel in one of the flat mode and the curved mode, the adjustable system including:
   a rod having a curved shape and mounted at edge portions in a length direction of the rear surface of the display panel, wherein a peak point of the curved shape is located at a center edge of the display panel;
a plurality of fixing devices attached to the rear of the display panel to support the rod; and
a driving system to transmit power to the rod, wherein the driving system includes:
   a motor generating a rotational force in one of a clockwise and a counterclockwise direction;
   a bracket receiving the rotary force of the motor and converting the rotary force of the motor into a linear force;
   a rack gear formed on the bracket; and
   a pinion connected to the rod at a region corresponding to the peak point, wherein the pinion and the rack gear interlock with each other such that the rack gear moves in a direction of the linear force and the pinion rotates in a direction opposite the rotational force of the motor.

2. The display device of claim 1, further comprising:
an outer case including a back cover and a cover window on a front surface of the display panel and adjustable system; and
a supporting mount connected to the outer case.

3. The display device of claim 1, wherein the display panel includes one of an organic light emitting diode (OLED) device, a liquid crystal display (LCD), a field emission display (FED), and electroluminescent display (ELD).

4. The display device of claim 1, wherein the rod includes aluminum (Al) or stainless steel material, wherein, the rod is sufficiently rigid to bend the display device.

5. The display device of claim 2, wherein the fixing devices include:
   a mounting portion directly mounted to the display panel; and
   a supporting portion enclosing and supporting the rod.

6. The display device of claim 5, further comprising a gap between an inner surface of the supporting portion and an outer surface of the rod, wherein the rod can rotate while being supported by the supporting portion.

7. An adjustable display device capable of being adjusted between a flat mode and a curved mode having a driving system and a display panel, the driving system comprising:
   a motor generating a rotary force in one of a first direction and a second direction;
   a bracket receiving the rotary force of the motor and converting the rotary force of the motor into a linear force;
   a rack gear on the bracket; and
   a pinion interlocked with the rack gear and connected to a curved shaped rod, wherein the rotary force generates a movement of the curved shape rod to move a portion of the display panel with respect to a center of the display panel, wherein when the rack gear moves in a direction of the linear force, the pinion rotates in a direction opposite the rotational force of the motor.

8. The display device of claim 7, wherein the rod is mounted at edge portions in a length directions of a rear surface of the display device using a plurality of fixing devices.

9. The display device of claim 8, wherein each of the plurality of fixing devices comprises:
   a mounting portion directly mounted to the display panel; and
   a supporting portion enclosing and supporting the rod.

10. The display device of claim 9, further comprising a gap between an inner surface of the supporting portion and an outer surface of the rod, wherein the rod can rotate while being supported by the supporting portion.

11. A method of adjusting a display device between a flat mode and a curved mode, the display device having a display panel, an adjustable system covering a rear of the display panel having a curved shape rod, a plurality of fixing devices supporting the rod and a driving system to transmit a power to the rod, wherein the driving system includes:
   a motor generating a rotational force in one of a clockwise and counterclockwise direction;
   a bracket receiving the rotary force of the motor and converting the rotary force of the motor into a linear force;
   a rack gear formed on the bracket; and
   a pinion connected to the curved shaped rod at a region corresponding to a peak point, wherein the pinion and the rack gear interlock with each other,
   the method comprising:
   activating the driving system to rotate the rod to adjust a curvature of the display panel, wherein when the rack gear of the driving system is moved in a direction of the linear force, the pinion is rotated in a direction opposite the rotational force of the motor.

12. The method of claim 11, wherein movement of the rod causes movement of a portion of the display panel.

13. The method of claim 12, wherein movement of the portion of the display panel causes the display panel to curve.

14. The method of claim 13, wherein movement of the portion of the display panel causes the display panel to flatten.

* * * * *